(12) United States Patent
Liang (10) Patent No.: US 12,281,972 B2
(45) Date of Patent: Apr. 22, 2025

(54) DEVICE AND METHOD FOR MEASURING SORET COEFFICIENT (71) Applicant: Linyi University, Linyi (CN)

(72) Inventor: Ruquan Liang, Linyi (CN)

(73) Assignee: Linyi Univesity, Linyi (CN)

( * ) Notice: Subject to any disclaimer, the term of this patent is extended or adjusted under 35 U.S.C. 154(b) by 567 days.

(21) Appl. No.: 17/741,089

(22) Filed: May 10, 2022

(65) Prior Publication Data
US 2023/0366799 A1    Nov. 16, 2023

(51) Int. Cl.
*G01N 13/00*    (2006.01)
(52) U.S. Cl.
CPC ....... *G01N 13/00* (2013.01); *G01N 2013/003* (2013.01)
(58) Field of Classification Search
None
See application file for complete search history.

(56) References Cited

U.S. PATENT DOCUMENTS 7,682,009 B1 *   3/2010   Sliwa, Jr. ............... B41J 29/377
                                                            347/95

* cited by examiner

*Primary Examiner* — Erica S Lin
(74) *Attorney, Agent, or Firm* — Westbridge IP LLC (57) ABSTRACT

Disclosed are a device and a method for measuring a Soret coefficient. The device comprises a control component, a diffusion mechanism, a temperature regulating component and a circulation mechanism. The diffusion mechanism comprises a liquid flow tank; the side wall of the inner cavity of the liquid flow tank is fixedly connected with an insulating layer; the side wall of that liquid flow tank is communicated with a plurality of liquid taking components; the circulation mechanism comprises a transfer unit, a cooling component and a heating unit; a temperature regulating component is fixedly connected between the liquid flow tank and the cooling component; the bottom surface of the heating unit is fixedly connected with the top surface of the liquid flow tank; the cooling component and the heating unit are respectively communicated with the transfer unit; the transfer unit is electrically connected with the control component.

9 Claims, 6 Drawing Sheets

DEVICE AND METHOD FOR MEASURING SORET COEFFICIENT

TECHNICAL FIELD

The application relates to the technical field of heat and mass transfer, and in particular to a device and a method for measuring a Soret coefficient.

BACKGROUND

The Soret effect refers to the diffusion movement of substance caused by the temperature gradient, meaning that substances diffuse under the influence of temperature gradient to form a new concentration distribution. The Soret coefficient is the coefficient that expresses the intensity of this thermal diffusion movement. The Soret effect has important applications in many fields, such as uranium enrichment and separation of rock layers. Therefore, it is of great significance to measure the Soret coefficient accurately and conveniently. The design idea of the existing device is that, according to the definition formula $$S_T = -\frac{1}{c(1-c)}\frac{\nabla C}{\nabla T}$$

of Soret coefficient, in the mixed components, the substances of each component are finally separated due to the temperature gradient and present different concentration distributions, and the Soret coefficient could be obtained by measuring the concentration change caused by the temperature gradient. The order of magnitude of Soret coefficient is very small. Generally, the range of organic matter or aqueous solution is $|S_T| \sim 10^{-3}$–$10^{-2} K^{-1}$. The thermal diffusion movement takes a long time to cause obvious concentration change, so the device needs to keep the temperature gradient for a long time. The existing Soret measuring devices are generally only used to measure oil, aqueous solution or magma, but can't measure other kinds of mixed liquids, so the measuring range is very limited and the application range is narrow.

SUMMARY

The purpose of the present application is to provide a Soret coefficient measuring device and a method to solve the above-mentioned problems in the prior art, and to realize simple measurement, accurate results, a simple structure and easy maintenance.

To achieve the above objective, the present application provides the following scheme:

a device for measuring a Soret coefficient, including a control component, a diffusion mechanism, a temperature regulating component and a circulation mechanism; the diffusion mechanism comprises a liquid flow tank; the side wall of the inner cavity of the liquid flow tank is fixedly connected with an insulating layer; the side wall of that liquid flow tank is communicated with a plurality of liquid taking components; the circulation mechanism comprises a transfer unit, a cooling component and a heating unit; a temperature regulating component is fixedly connected between the liquid flow tank and the cooling component; the bottom surface of the heating unit is fixedly connected with the top surface of the liquid flow tank; the cooling component and the heating unit are respectively communicated with the transfer unit; and the transfer unit is electrically connected with the control component.

Preferably, the bottom surface of the inner cavity of the liquid flow tank is fixedly connected with a first temperature sensor; and the first temperature sensor is electrically connected with the control component.

Preferably, the temperature regulating component comprises a thermoelectric cooler; the top surface of the thermoelectric cooler is fixedly connected with a heat transfer plate; the top surface of that heat transfer plate is fixedly connected with the bottom surface of the liquid flow tank; and the top surface of that thermoelectric cooler is fixedly connected with the cooling component.

Preferably, the heating unit comprises a heating box; the heating box has a hollow structure; circulating water is filled in the heating box; the bottom surface of that heating box is fixedly connected with the top surface of the liquid flow tank; the side wall of the heating box is fixedly connected and communicated with the transfer unit and the cooling component respectively; a second temperature sensor is fixedly connected to the inner wall of the heating box; the second temperature sensor is electrically connected with the control component.

Preferably, the cooling component comprises a cooling box; the top surface of the cooling box is fixedly connected with the bottom surface of the thermoelectric cooler; the cooling box has a hollow structure; the cooling box is filled with the circulating water; and the side wall of the cooling box is fixedly connected and communicated with the transfer unit and the heating unit, respectively.

Preferably, the transfer unit comprises a transfer box; the bottom surface of that transfer box is fixedly connected and communicated with a first pipeline; the bottom of the inner cavity of the transfer box is fixedly connected with a heating wire; one end of that first pipeline is fixedly connected and communicated with one side of the cooling box; the other side of the cooling box is fixedly connected and communicated with a second pipeline; one end of the second pipeline is fixedly connected with and communicated with one side of the heating box; a third pipeline is fixedly connected and communicated between the other side of the heating box and the transfer box; the first pipeline and the third pipeline are respectively arranged with a water pump; the heating wire and the water pumps are electrically connected with the control component, respectively.

Preferably, the liquid taking components comprise liquid taking pipes and liquid taking plugs; the liquid taking plugs are in interference fit with the liquid taking pipes; one end on the same side of each liquid taking pipe penetrates through the side wall of the liquid flow tank and the side wall of the insulating layer, respectively, and is fixedly connected with the side wall of the liquid flow tank and the side wall of the insulating layer, respectively.

Preferably, the insulating layer is made of hydrophobic aerogel.

Preferably, the control component is a Programmable Logic Controller (PLC) controller.

A method for measuring the Soret coefficient includes the following steps:

S1: assembling device: assembling the control component, the diffusion mechanism, the temperature regulating component, the transfer unit, the cooling component and the heating unit, where the cooling component is arranged at the bottom of the liquid flow tank;

S2: injecting measured liquid into the inn cavity of the liquid flow tank, and getting the liquid flow tank standing;

S3: cooling and refrigerating the liquid flow tank by using the temperature regulating component, heating the cooling component by the heat generated by the other side of the temperature regulating component, keeping the bottom of the liquid flow tank at a constant temperature of 10° C. by using the temperature regulating component, and keeping the top of the liquid flow tank at a constant temperature of 20-70° C. by using the transfer unit and the heating unit;

S4: collecting data by sampling from several liquid taking components with needle tubes every 40-50 minutes, then measuring the density of the liquid to be measured by Abbe refractometer or densitometer, and averaging the data to reduce the error;

S5: repeating S4 until the density of the measured liquid does not change, and ending experiment; and S6: processing data through drawing a curve $$\frac{\Delta c(t)}{\Delta T c_0 (1 - c_0)}$$

with the help of fitting the data points by the software tablecurve 2d and the measured $\Delta T$ and $\Delta C$ in the experiment to obtain the values of Soret coefficient ST, where $\Delta T$ is the temperature difference, $\Delta C$ is the concentration difference, and $C_0$ is the initial concentration and t is the time variable.

The device of the application can be applied in the measuring Soret coefficient of most solutions, with reliable results, simple structure, easy disassembly and maintenance and low manufacturing cost.

According to the application, the hydrophobic aerogel is used to make the insulating layer, which can not only avoid the diffusion of substances in the horizontal direction of the measured liquid caused by the temperature rise of the side wall of the liquid flow tank, but also keep the temperature difference between the upper and lower parts of the measured liquid stable and improve the experimental efficiency.

The liquid flow tank in the application is communicated with a plurality of liquid taking components, so that the gradient detection of the measured liquid is realized, and the experiment measurement data is more stable and accurate.

BRIEF DESCRIPTION OF THE DRAWINGS

In order to more clearly explain the embodiments of the present application or the technical schemes in the prior art, the drawings needed in the embodiments will be briefly introduced below. Obviously, the drawings in the following description are only some embodiments of the present application, and for ordinary technicians in the field, other drawings could be obtained according to these drawings without making creative efforts.

DETAILED DESCRIPTION OF THE EMBODIMENTS

Next the technical schemes in the embodiments of the present application will be clearly and completely described with reference to the drawings in the embodiments of the present application. Obviously, the described embodiments are only part of the embodiments of the present application, not all of them. Based on the embodiments in the present application, all other embodiments obtained by ordinary technicians in the field without creative work are within the scope of the present application.

In order to make the above-mentioned objectives, features and advantages of the present application more obvious and easier to understand, the present application will be described in further detail below with reference to the drawings and detailed description.

A device for measuring Soret coefficient shown in FIG. 1-FIG. 4 comprises a control component 1, a diffusion mechanism 2, a temperature regulating component 3 and a circulation mechanism 4; the diffusion mechanism 2 comprises a liquid flow tank 21; a side wall of an inner cavity of the liquid flow tank 21 is fixedly connected with an insulating layer 22; the side wall of the liquid flow tank 21 is communicated with a plurality of liquid taking components 2a; the circulation mechanism 4 comprises a transfer unit 4a, a cooling component 4b and a heating unit 4c; the temperature regulating component 3 is fixedly connected between the liquid flow tank 21 and the cooling component 4b; the bottom surface of the heating unit 4c is fixedly connected with the top surface of the liquid flow tank 21; the cooling component 4b and the heating unit 4c are respectively communicated with the transfer unit 4a; the transfer unit 4a is electrically connected with the control component 1.

In a further optimization scheme, the bottom surface of the inner cavity of the liquid flow tank 21 is fixedly connected with the first temperature sensor 5; the first temperature sensor 5 is electrically connected with the control component 1.

In a further optimization scheme, the temperature regulating component 3 comprises the thermoelectric cooler 31; the top surface of the thermoelectric cooler 31 is fixedly connected with the heat transfer plate 32; the top surface of that heat transfer plate 32 is fixedly connected with the bottom surface of the liquid flow tank 21; the top surface of that thermoelectric cooler 31 is fixedly connected with the cooling component 4b.

Furthermore, the thermoelectric cooler 31 is a semiconductor thermoelectric cooler in the prior art and will not be described in detail here. The top surface of the thermoelectric cooler 31 is a cooling surface, which can absorb the heat in the liquid flow tank 21 through the heat transfer plate 32, so that the temperature of the measured liquid in the liquid flow tank 21 can be reduced.

In a further optimization scheme, the heating unit 4c comprises the heating box 47; the heating box 47 has a hollow structure; circulating water is filled in the heating box 47; the bottom surface of that heating box 47 is fixedly connected with the top surface of the liquid flow tank 21; the side wall of the heating box 47 is fixedly connected and communicated with the transfer unit 4a and the cooling component 4b, respectively; the second temperature sensor 48 is fixedly connected to the inner wall of the heating box 47; and the second temperature sensor 48 is electrically connected with the control component 1.

In a further optimization scheme, the cooling component 4b comprises the cooling box 49; the top surface of the cooling box 49 is fixedly connected with the bottom surface of the thermoelectric cooler 31; the cooling box 49 has a hollow structure; the cooling box 49 is filled with the circulating water; and the side wall of the cooling box 49 is fixedly connected and communicated with the transfer unit 4a and the heating unit 4c, respectively.

Furthermore, the cooling box 49 and the heating box 47 are made of a good thermal conductor material, preferably aluminum alloy, to improve the heat transfer efficiency.

Figure 1:
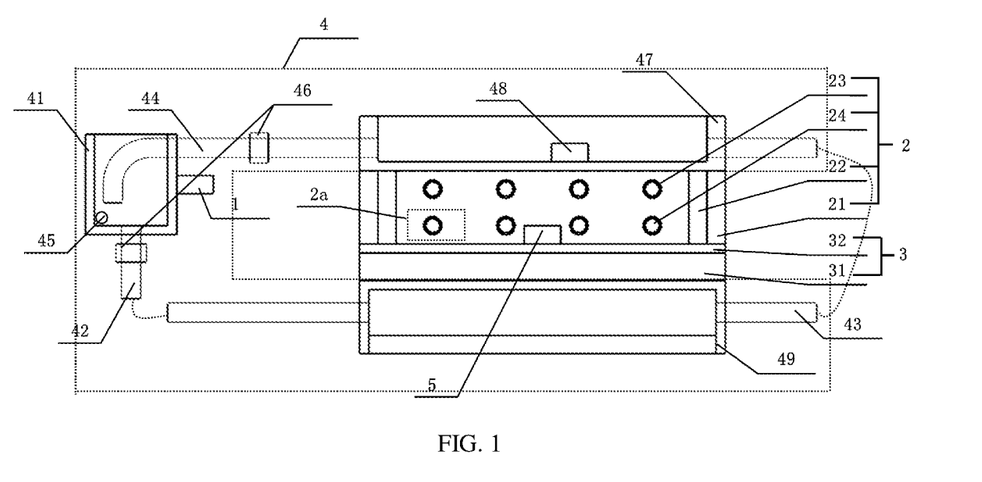
FIG. 1 is a schematic diagram of the front view structure of the present application.
Figure 2:
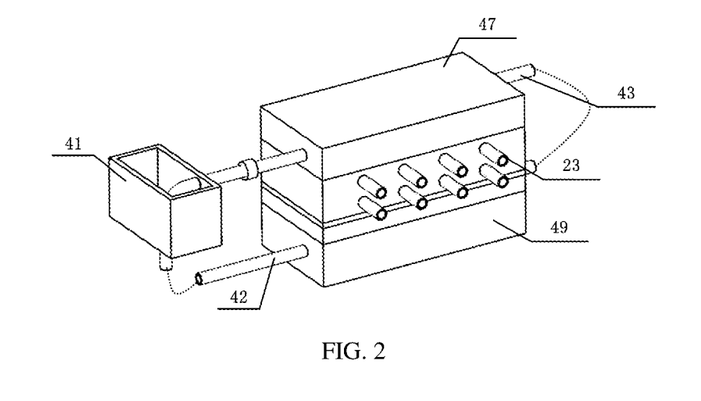
FIG. 2 is a schematic side view of the present application.
Figure 3:
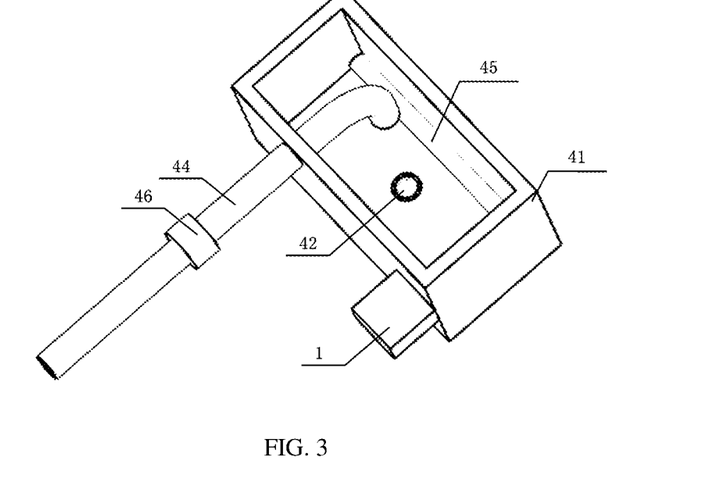
FIG. 3 is a schematic side view of the transfer unit.
Figure 6:
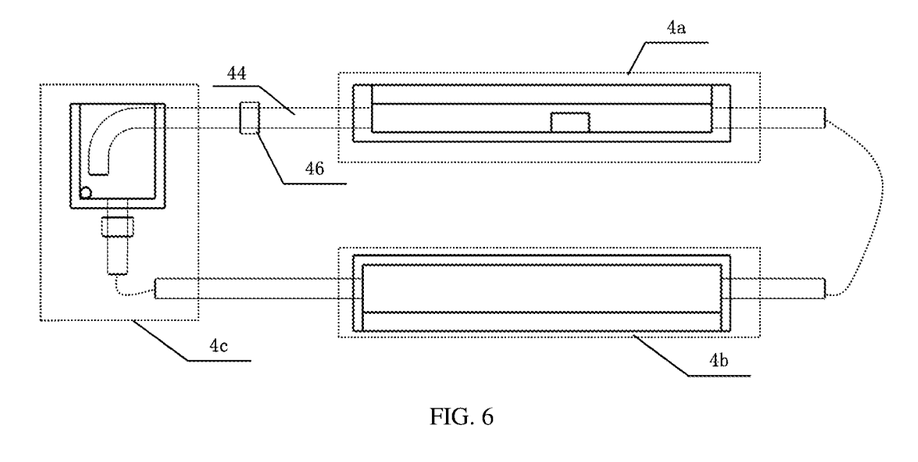
FIG. 6 is a schematic diagram of the front view structure of a circulation mechanism.

In a further optimization scheme, the transfer unit 4a comprises the transfer box 41; the bottom surface of that transfer box 41 is fixedly connected and communicated with the first pipeline 42; the bottom of the inner cavity of the transfer box 41 is fixedly connected with the heating wire 45; one end of that first pipeline 42 is fixedly connected and communicated with one side of the cooling box 49; the other side of the cooling box 49 is fixedly connected and communicated with the second pipeline 43; one end of the second pipeline 43 is fixedly connected with and communicated with one side of the heating box 47; the third pipeline 44 is fixedly connected and communicated between the other side of the heating box 47 and the transfer box 41; the first pipeline 42 and the third pipeline 44 are respectively arranged with a water pumps 46; the heating wire 45 and the water pumps 46 are electrically connected with the control component 1, respectively.

Figure 4:
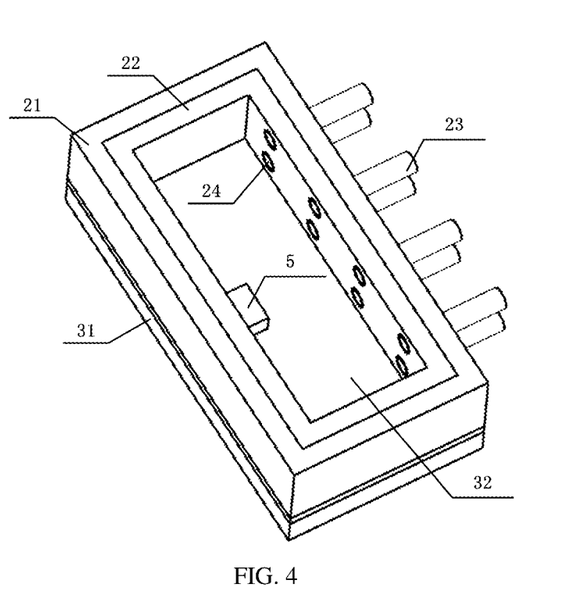
FIG. 4 is a schematic side view of the diffusion mechanism.

In a further optimization scheme, the liquid taking components 2a comprise the liquid taking pipes 23 and the liquid taking plugs 24; the liquid taking plugs 24 are in interference fit with the liquid taking pipes 23; one end on the same side of each liquid taking pipe 23 penetrates through the side wall of the liquid flow tank 21 and the side wall of the insulating layer 22 respectively, and is fixedly connected with the side wall of the liquid flow tank 21 and the side wall of the insulating layer 22, respectively.

Furthermore, the same side of the liquid flow tank 21 and the insulating layer 22 are provided with several rows and columns of communication holes at equal intervals, and the communication holes correspond to the liquid taking pipes 23 one by one, respectively, so that multi-level sampling of the measured liquid in the liquid flow tank 21 could be realized, and the comprehensiveness and accuracy of the results could be improved.

In a further optimization scheme, the insulating layer 22 is made of hydrophobic aerogel.

Furthermore, the hydrophobic aerogel is preferably made of graphene aerogel, which has good heat insulation and hydrophobicity.

In a further optimization scheme, the control component 1 is a Programmable Logic Controller (PLC) controller in the prior art and will not be described in detail.

Figure 5:
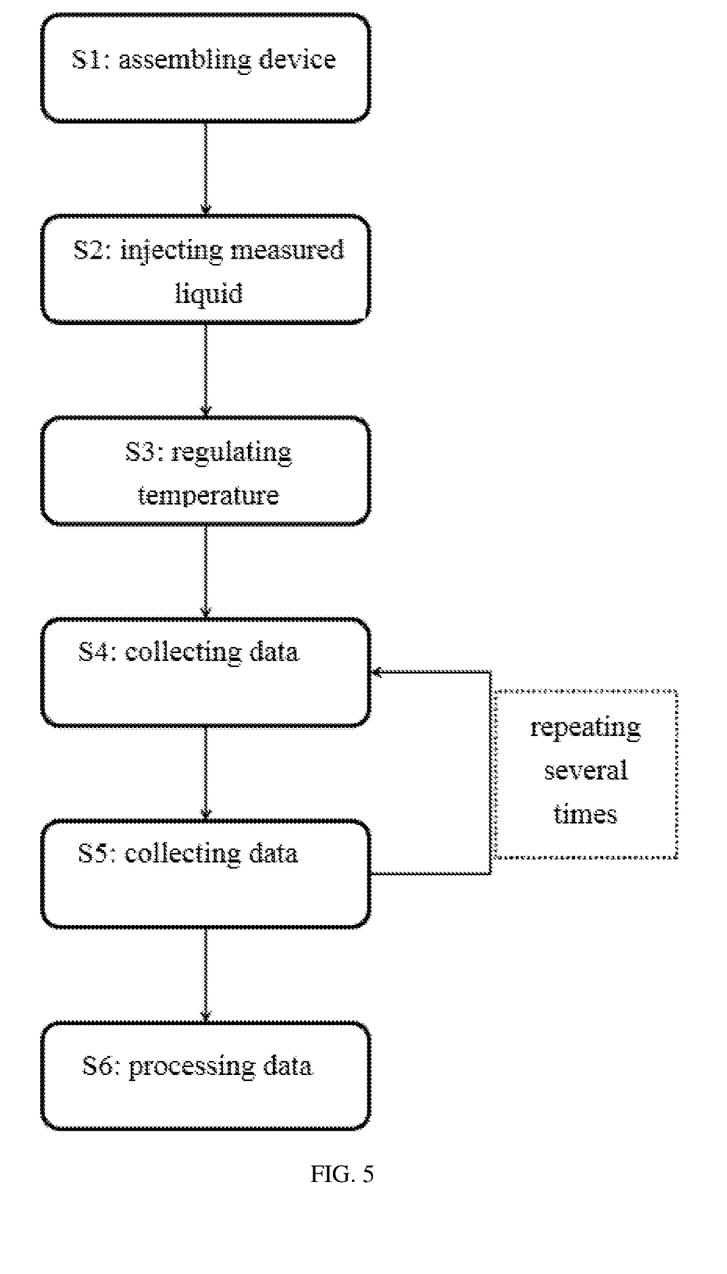
FIG. 5 is a schematic flow diagram of a Soret coefficient experiment.

A method for measuring Soret coefficient, including the following steps:

S1: assembling device: assembling the control component 1, the diffusion mechanism 2, the temperature regulating component 3, the transfer unit 4a, the cooling component 4b and the heating unit 4c, where the cooling component 4b is arranged at the bottom of the liquid flow tank 21;

S2: injecting measured liquid into the inn cavity of the liquid flow tank 21, and getting the liquid flow tank standing;

furthermore, the present application starts the research on sugar Soret effect by exploring the basic law of oligosaccharide Soret effect, so the binary aqueous solution of glucose and sucrose is preferably used to study the components of the measured liquid.

S3: cooling and refrigerating the liquid flow tank 21 by using the temperature regulating component 3, heating the cooling component 4b by the heat generated by the other side of the temperature regulating component 3, keeping the bottom of the liquid flow tank 21 at a constant temperature of 10° C. by using the temperature regulating component 3, and keeping the top of the liquid flow tank 21 at a constant temperature of 20-70° C. by using the transfer unit 4a and the heating unit 4c;

furthermore, the thermoelectric cooler 31 is a semiconductor thermoelectric cooler, which will emit a lot of heat energy during the cooling process. In order to save energy, the cooling box 49 absorbs the heat emitted by the thermoelectric cooler 31, and the water pumps 46 located on the first pipeline 42 introduce the heat into the transfer box 41 through circulating water, and the heating wires 45 arranged in the transfer box 41 are used for auxiliary heating, so as to avoid the heat shortage of the thermoelectric cooler 31. As a result, the temperature difference between the upper and lower parts of the measured liquid does not meet the requirements of the experiment. The first temperature sensor 5 monitors the temperature in the liquid flow tank 21, and the second temperature sensor 48 monitors the temperature of the circulating water in the heating box 47. The temperature difference between the top and bottom parts of the liquid flow tank 21 could be adjusted by controlling the heating wire, the thermoelectric cooler 31 and the water pumps 46 by the control component 1.

S4: collecting data by sampling from several liquid taking components 2a with needle tubes every 40-50 minutes, then measuring the density of the liquid to be measured by Abbe refractometer or densitometer, and averaging the data to reduce the error;

S5: repeating S4 until the density of the measured liquid does not change, and ending experiment; and S6: processing data through drawing a curve $$\frac{\Delta c(t)}{\Delta T c_0 (1 - c_0)}$$

with the help of fitting the data points by the software table curve 2d and the measured $\Delta T$ and $\Delta C$ in the experiment to obtain the values of Soret coefficient ST, where $\Delta T$ is the temperature difference, $\Delta C$ is the concentration difference, and $C_0$ is the initial concentration and t is the time variable.

In the description of the present application, it should be understood that the orientation or position relationships indicated by the terms "longitudinal", "transverse", "upper", "lower", "front", "rear", "left", "right", "vertical", "horizontal", "top", "bottom", "inner", "outer" are based on the orientation or position relationships shown in the figures, which are only for the convenience of describing the present application, rather than indicating or implying that the device or elements must be in designated orientation, or configured or operated in designated orientation so that they cannot be understood as the limitation of this application.

The above-mentioned embodiments only describe the preferred mode of the present application, and do not limit the scope of the present application. Without departing from the design spirit of the present application, all kinds of modifications and improvements made by ordinary technicians in the field to the technical scheme of the present application should fall within the protection scope determined by the claims of the present application.

What is claimed is:

1. A method for measuring a Soret coefficient, adopting a measuring device, the measuring device comprising a control component, a diffusion mechanism, a temperature regulating component and a circulation mechanism, wherein the diffusion mechanism comprises a liquid flow tank; a side wall of an inner cavity of the liquid flow tank is fixedly connected with an insulating layer; a side wall of the liquid flow tank is communicated with a plurality of liquid taking components; the circulation mechanism comprises a first box, a second box and a third box; the temperature regulating component is fixedly connected between the liquid flow tank and the second box; a bottom surface of the third box is fixedly connected with a top surface of the liquid flow tank; the second box and the third box are respectively communicated with the first box; the first box is electrically connected with the control component; and circulating water is filled in the second box and the third box; and the method comprising:

S1: assembling the control component, the diffusion mechanism, the temperature regulating component, the first box, the second box and the third box, wherein the second box is arranged at a bottom surface of the liquid flow tank;

S2: injecting measured liquid into the inn cavity of the liquid flow tank, and getting the liquid flow tank standing;

S3: cooling and refrigerating the liquid flow tank through one side of the temperature regulating component, heating the circulating water in the second box by the heat generated by another side of the temperature regulating component, keeping a bottom of the liquid flow tank at a constant temperature of 10 degrees Celsius by the temperature regulating component, and keeping a top of the liquid flow tank at a constant temperature of 20 degrees Celsius to 70 degrees Celsius by the first box and the third box;

S4: collecting data by sampling from the plurality of liquid taking components with needle tubes every 40-50 minutes, then measuring the density of the liquid to be measured by Abbe refractometer or densitometer, and averaging the data to reduce error;

S5: repeating S4 until the density of the measured liquid does not change, and ending an experiment; and S6: processing data through drawing a curve $$\frac{\Delta c(t)}{\Delta T c_0 (1 - c_0)}$$

with the help of fitting the data points by the software tablecurve 2d and the measured $\Delta T$ and $\Delta C$ in the experiment to obtain the values of Soret coefficient ST, wherein $\Delta T$ is the temperature difference, $\Delta C$ is the concentration difference, and $C_0$ is the initial concentration and t is the time variable.

2. The method according to claim 1, wherein a first temperature sensor is fixedly connected to a bottom of the inner cavity of the liquid flow tank; and the first temperature sensor is electrically connected with the control component.

3. The method according to claim 2, wherein the temperature regulating component comprises a thermoelectric cooler; a top surface of the thermoelectric cooler is fixedly connected with a heat transfer plate; a top surface of the heat transfer plate is fixedly connected with the bottom surface of the liquid flow tank; and a bottom surface of the thermoelectric cooler is fixedly connected with the second box.

4. The method according to claim 3, wherein the third box has a hollow structure; a side wall of the third box is fixedly connected and communicated with the first and the second, respectively; a second temperature sensor is fixedly connected to an inner wall of the third box; and the second temperature sensor is electrically connected with the control component.

5. The method according to claim 4, wherein a top surface of the second box is fixedly connected with the bottom surface of the thermoelectric cooler; the second box has a hollow structure; and a side wall of the second box is fixedly connected and communicated with the first box and the third box respectively.

6. The method according to claim 5, wherein a bottom of the first box is fixedly connected and communicated with a first pipeline; a bottom of the inner cavity of the first box is fixedly connected with a heating wire; one end of the first pipeline is fixedly connected and communicated with one side of the second box; another side of the second box is fixedly connected and communicated with a second pipeline; one end of the second pipeline is fixedly connected and communicated with one side of the third box; a third pipeline is fixedly connected and communicated between another side surface of the third box and the first box; each of the first pipeline and the third pipeline is arranged with a water pump; and the heating wire and the water pump are electrically connected with the control component, respectively.

7. The method according to claim 1, wherein the liquid taking components comprise liquid taking pipes and liquid taking plugs; the liquid taking plugs are in interference fit with the liquid taking pipes; one end on the same side of each liquid taking pipe penetrates through the side wall of the liquid flow tank and a side wall of the insulating layer, respectively, and is fixedly connected with the side wall of the liquid flow tank and the side wall of the insulating layer, respectively.

8. The method according to claim 1, wherein the insulating layer is made of hydrophobic aerogel.

9. The method according to claim 1, wherein the control component is a Programmable Logic Controller (PLC) controller.

* * * * *